United States Patent [19]

van Bonn et al.

[11] Patent Number: 5,322,563

[45] Date of Patent: Jun. 21, 1994

[54] PROCESS FOR COLORING BUILDING MATERIALS

[75] Inventors: Karl-Heinz van Bonn, Moers; Bernd Kröckert, Wesel; Günter Linde, Krefeld, all of Fed. Rep. of Germany

[73] Assignee: Bayer Aktiengesellschaft, Leverkusen, Fed. Rep. of Germany

[21] Appl. No.: 85,628

[22] Filed: Jul. 6, 1993

[30] Foreign Application Priority Data

Jul. 17, 1992 [DE] Fed. Rep. of Germany ....... 4223598

[51] Int. Cl.$^5$ ................................................ C09C 1/22
[52] U.S. Cl. ..................................... 106/712; 106/425; 106/437; 106/453; 106/456
[58] Field of Search ............... 106/437, 425, 453, 456, 106/712

[56] References Cited

U.S. PATENT DOCUMENTS 4,277,288 7/1981 Lawrence et al. .................. 106/413
4,946,505 8/1990 Jungk ................................... 106/712

FOREIGN PATENT DOCUMENTS 633903 11/1990 Australia .

OTHER PUBLICATIONS

Din Iso 737/11, (Aug. 1, 1981).

Primary Examiner—Mark L. Bell
Assistant Examiner—Scott L. Hertzog
Attorney, Agent, or Firm—Connolly & Hutz

[57] ABSTRACT

A method for coloring building materials is disclosed, wherein a pigment suspension is added to the building materials. The pigment suspension based on pigment granules contains at least one pigment such as iron oxide, and a soluble phosphate salt. The soluble phosphate salt has a number ratio of monofunctional metal ions to phosphorus of 2:1 to 1:1, and is exemplified by sodium pyrophosphate, sodium polyphosphate, and sodium hexametaphosphate.

12 Claims, No Drawings

PROCESS FOR COLORING BUILDING MATERIALS

This invention relates to a process for coloring building materials with inorganic pigments in the form of granules.

If they are to be made in colors, cement- and lime-bonded building materials, such as plasters, lime-sand bricks, fiber cement parts or cast stones, more particularly roofing tiles and paving setts and also flagstones, are generally pigmented with inorganic pigments. Thus, it is standard practice in the building industry to use iron oxides or iron oxide hydroxides as red, black, brown or yellow pigments, manganese oxides as brown-black pigments, chromium oxides as green pigments and titanium dioxides as white pigments. Further examples include carbon blacks as black pigments, nickel or chromium rutiles as yellow pigments or cobalt-containing spinels as blue and green pigments, copper-containing spinels as black pigments and also mixed crystals or barium sulfate and barium manganate as blue pigments.

For coloring concrete products, the pigments are normally used in powder form. In this form, they have the advantage of ready dispersibility. The completely homogeneous incorporation of pigment powders in concrete mixtures takes only a short time of up to a few minutes. However, the disadvantage of fine powders is that they show poor flow behavior and often agglomerate and form lumps in storage. This complicates accurate metering. Another disadvantage of some powders is that they tend to emit dust.

It is known that these disadvantages in the pigmenting of concrete parts can be avoided by using aqueous pigment suspensions instead of dry pigment powders. The use of such pastes or slurries which contain from 30 to 70% by weight pigment has made only slow progress because, in view of the additional water content, considerably higher transport costs are involved, depending on the distance from the point of production to the point of use. In addition, the large quantity of water supplied with the paste cannot be processed in every concrete preparation. The content of organic chemicals can also be troublesome.

Accordingly, the building materials industry has largely continued to use dry pigment powders. Hitherto, an obstacle to the use of pigments in the form of microgranules has been the view that granules were less readily dispersible in concrete preparations. Poorly dispersible pigment agglomerates require considerably longer mixing times. With the short mixing times typically used in the building materials industry, streaks, specks or color spots appear on the concrete surface due to poor pigment distribution. The pigment is unable to develop its coloring strength so that relately large quantities of pigment have to be used for the same intensity of color of the concrete part.

DE-C 3 619 363 describes pigment granules for pigmenting concrete products which consist essentially of pigment and one or more binder(s) to promote the dispersion of the pigment in the concrete. The following are mentioned as binders which act as dispersion aids in the concrete: alkylbenzene sulfonate, alkyl naphthalene sulfonate, lignin sulfonate, sulfated polyglycol ethers, melamine/formaldehyde condensates, naphthalene/formaldehyde condensates, gluconic acid, salts of low molecular weight, partly esterified styrene/maleic anhydride copolymers and copolymers of vinyl acetate and crotonic acid. The percentage content in the pigment is said to be preferably between 2 and 6% by weight.

The dispersion aids mentioned act as plasticizers in concrete mixtures. They influence the water-to-cement ratio and act on the consistency of the concrete.

In the inorganic pigment itself, the binders added—as organic substances—represent impurities.

According to DE-A 2 940 156, the inorganic starting pigment has a resin content of at least 20%. Corresponding granules are difficult to incorporate in concrete due to the resin components of hydrophobicized agglomerates.

DE-C 3 918 694 describes a process for coloring building materials with inorganic pigments in the form of microgranules, in which inorganic compounds are added to the pigments. The granules thus produced are distinguished by good flow behavior, which provides for easy metering, and by stability suitable for handling. However, the effort involved in dispersing the granules produced varies more or less considerably in dependence upon the type of binder used. Whereas, in cases where silicates are used, the effort involved in dispersion in the concrete generally increases with time, granules containing orthophosphate as binder require relatively intensive dispersion immediately after their production.

However, the processing of pigment granules requires granules which, in addition to satisfying the known requirements in regard to flow behavior and stability, are also readily dispersible.

Now, the problem addressed by the present invention was to provide a process for coloring building materials which would give microgranules showing improved dispersion behavior by comparison with the prior art.

This problem has been solved by a process for coloring building materials with inorganic pigments in the form of granules, the pigment granules consisting of a suspension of one or more pigments and a soluble phosphate salt with a number ratio of monovalent metal ion to phosphorus variable from 2:1 to 1:1. The preferred quantity of phosphate salt used, expressed as phosphate and based on pigment, is between 0.1 and 5% by weight.

It has surprisingly been found that, where salts of condensed phosphates are added, the dispersion properties of the granules are distinctly improved by comparison with the prior art. At the same time, the properties required for granules (stable handling, no dust emission) remain intact. The granules may advantageously be produced in the form of bead granules, for example in spray dryers or fluidized bed dryers or granulators, or in the form of pellets in pan granulators, coating drums or comparable units known to the expert.

Pigments containing polyvalent cations of the transition metals are preferred. Pigments containing titanium dioxide, iron oxide, chromium oxide, manganese oxide and/or zinc oxide are particularly preferred, iron oxide pigments being most particularly preferred. However, good results are also obtained with mixed phase pigments.

In a particularly preferred embodiment, the soluble phosphate salt added in accordance with the invention is used in a quantity of 0.1 to 2% by weight, based on pigment. The cations emanate from ions of the first main group of the periodic system of elements, preferably sodium, potassium or the alkali-metal-like ammonium ion. The phosphates used are chain-condensed phosphates or ring-condensed phosphates, the number ratio of monovalent cation to phosphorus being from 2:1 to 1:1.

Typical representatives of this class of compounds are sodium pyrophosphate ($Na_4P_2O_7$), sodium tripolyphosphate ($Na_5P_3O_{10}$), Calgon 188N (sodium polyphosphate with crosslinked chains, a product of BK Ladenburg) and also sodium hexametaphosphate ($[NaPO_3]_6 \times H_2O$).

It has been found that the granules according to the invention should not exceed a particle size dependent on the pigment. This is primarily determined by the apparent density of the granules which in turn is a measure of the porosity of the particles. In the case of spray granulation, porosity is in turn dependent upon the solids content of the pumpable starting suspension before drying which can vary considerably in dependence upon the particle size and shape of the pigment. The compacted bulk volume or compacted bulk weight as defined in DIN 53 194 of August, 1957 is a measure of apparent density.

The pigment granules used in the process according to the invention are distinguished by the fact that they do not disintegrate during determination of their compacted bulk weight. The granules according to the invention preferably have a compacted bulk weight of 0.5 to 2.5 g/cm$^3$ and, more preferably, in the range from 0.8 to 1.5 g/cm$^3$. This corresponds with the particle size. In the case of spray drying the average particle size of 500 μm should not be exceeded. Granules obtained by pelletizing should not exceed an average particle size of 1 cm.

The particle size should also not be too small because the fines below about 50 μm in size (depending on the pigment properties) are responsible for the dust emission of a dry powder. In addition, free flow deteriorates with any increase in the fine component. The average particle size of the granules obtained in accordance with the invention by spray drying is between 30 and 500 μm and preferably between 100 and 300 μm. Granules obtained by pelletizing preferably have an average particle size of 100 μm to 1 cm.

Pigment granules of this particle size are handling-stable, free flowing powders with no dust emission which are eminently suitable for pigmenting building materials. In contrast to the disclosure of DE-C 36 19 363, the shear forces on the granules in concrete preparations are sufficient for complete pigment dispersion during the mixing cycle. Particularly good results are obtained with iron oxide pigments. The compacted bulk weight of the granules can vary according to the type of pigment and the form and quantity in which it is added and the water content of the suspension. Low compacted bulk weights lead to granules of poor stability while high compacted bulk weights lead to poor dispersibility. The iron oxide black granules according to the invention preferably have compacted bulk weights of 1.2 to 1.6 g/cm$^3$.

The granules used in accordance with the invention typically contain 0.1 to 4% by weight water. Depending on the fineness and shape of the pigment particles, the water content can be higher without any adverse effect on free flow.

Dispersibility in concrete was tested by measuring coloring strength on prisms made with white cement using the following parameters: cement-to-quartz sand ratio 1:4, water-to-cement ratio 0.35, pigmenting level 1.2%, based on cement, mixer used: from RK Toni Technik, Berlin, with a 5 liter mixing bowl, type 1551, rotational speed 140 r.p.m. (batch size: 500 g cement). After 80, 100, 150 and 200 seconds, four mixture samples (300 g) were taken and used to make test specimens (5×10×2.5 cm) under pressure (32.5 N/mm$^2$). Curing of the test specimens: 24 hours at 30° C./95% relative air humidity with subsequent drying for 24 hours at 50° C. Color data measured with a Hunterlab instrument: 3 measuring points per upper surface and lower surface, 24 measuring points per pigment mixture. The average values obtained are related to the powder tested for a mixing time of 80 s (final coloring strength=100%).

The following Examples are intended to illustrate the process according to the invention without limiting it in any way.

EXAMPLE 1

An aqueous suspension of iron oxide red (Bayferrox ® 130, a product of Bayer AG), which has a solids content of 60% by weight and contains 1.3% added sodium tripolyphosphate ($Na_5P_3O_{10}$), based on solids, was introduced through a nozzle into a spray dryer under a pressure of 23 bar. The nozzle orifice was 1.2 mm in diameter and the turbulence chamber had a thickness of 2.7 mm. The temperatures were 280° C. in the entry zone and 140° C. in the exit zone.

65 kg/h iron oxide red pigment in the form of granules having an average particle size of 150 μm and a residual moisture content of 0.3% are obtained. The compacted bulk weight of the granules was 1.20 g/cm$^3$. In the test for dispersibility in concrete, final coloring strength was reached after 80 seconds.

EXAMPLE 2

An aqueous suspension of iron oxide red (Bayferrox ® 110, a product of Bayer AG), which has a solids content of 60% by weight and contains 2.2% added sodium hexametaphosphate ($[NaPO_3]_6 \times H_2O$), based on solids, was sprayed through a hollow cone nozzle (spraying angle 30°, bore diameter 1.1 mm) into a spray dryer under a pressure of 3 bar. From the natural gas surface burner, the combustion gases entered the spray dryer with a temperature of 450° C. The exit temperature of the gases was 145° C.

Approximately 21 kg/h iron oxide red pigment in the form of granules with an average particle size of 150 μm and a residual moisture content of 0.8% are obtained. The compacted bulk weight of the granules was 1.25 g/cm$^3$. In the test for dispersibility in concrete, final coloring strength was reached after 80 seconds.

EXAMPLE 3

An aqueous suspension containing approx. 50% by weight $Fe_3O_4$ (Bayferrox ® 318, a product of Bayer AG) and 1.4% sodium tripolyphosphate ($Na_4P_2O_7$), based on solids, was applied to the distributor disk of a disk-type spray dryer under a pressure of 0.5 bar. The peripheral speed of the disk was 88 m/s. From the natural gas surface burner, the combustion gases entered the spray dryer with a temperature of 380° C. The exit temperature of the gases was 105° C.

95 kg/h iron oxide black pigment in the form of mechanically stable granules with an average particle size of 100 μm and a residual moisture content of 0.5% by weight were obtained. The compacted bulk weight of the granules was 1.14 g/cm$^3$. In the test for dispersibility in concrete by measurement of the coloring strength, final coloring strength was reached after a mixing time of 80 seconds.

EXAMPLE 4

An aqueous suspension of iron oxide yellow (Bayferrox ® 420, a product of Bayer AG), which has a solids content of 35% by weight and contains 1.1% added Calgon 188N (a product of BK Ladenburg), based on solids, was sprayed through a hollow cone nozzle (spraying angle 30°, bore diameter 1.1 mm) into a spray dryer under a pressure of 3 bar. From the natural gas surface burner, the combustion gases entered the spray dryer with a temperature of 450° C. The exit temperature of the gases was 145° C.

Approximately 21 kg/h iron oxide yellow pigment in the form of granules with an average particle size of 150 μm and a residual moisture content of 0.8% are obtained. The compacted bulk weight of the granules was 0.54 g/cm$^3$. In the test for dispersibility in concrete, final coloring strength was reached after 80 seconds.

Comparison Example 1

An aqueous iron oxide red suspension is processed as in Example 1. Instead of sodium tripolyphosphate, 1.7% commercially available sodium orthophosphate (Na$_3$PO$_4$) is used as the additive. Even after a dispersion time of 100 seconds, coloring strength only reached 38% of the powder. After a dispersion time of 200 seconds, coloring strength could only be slightly increased to 56% of the powder.

Ccomparison Example 2

An aqueous iron oxide red suspension is processed as in Example 2. Instead of sodium hexametaphosphate, 3.5% sodium orthophosphate (Na$_3$PO$_4$) was used as the additive. After a dispersion time of 100 seconds, a coloring strength of only 30% was reached in the concrete.

Comparison Example 3

An iron oxide black suspension is processed in the same way as in Example 3. Instead of sodium pyrophosphate, sodium orthophosphate (Na$_3$PO$_4$) is added to the suspension. Incorporation in concrete produced a coloring strength of 88% after a dispersion time of 100 seconds.

Comparison Example 4

An iron oxide black suspension is processed in the same way as in Example 4. Instead of Calgon 188N, however, sodium orthophosphate (Na$_3$PO$_4$) is used as additive. After a dispersion time of 100 seconds, the coloring strength of the granules in the concrete amounted to 90% of the final coloring strength.

What is claimed:

1. A process for the pigmenting building materials by the addition of inorganic pigments in the form of granules, wherein the pigment granules comprise a suspension of one or more pigments and soluble phosphate salt with a number ratio of monofunctional metal ions to phosphorus of 2:1 to 1:1.

2. A process as claimed in claim 1, wherein the content of soluble phosphate salts in the suspension is from 0.1 to 5% by weight, expressed as phosphate and based on weight of pigment.

3. A process as claimed in claim 1, wherein the pigments are selected from the group consisting of titanium dioxide, iron oxide, chromium oxide, manganese oxide or zinc oxide.

4. A process as claimed in claim 3, wherein the pigments are iron oxide pigments.

5. A process as claimed in claim 4, wherein the iron oxide pigments are iron oxide red granules having a compacted bulk weight of 1.2 to 1.6 g/cm$^3$.

6. A process as claimed in claim 1, wherein the pigments are inorganic mixed-phase pigments.

7. A process as claimed in claim 1, wherein the soluble phosphate salts are chain-condensed phosphates (polyphosphates) or ring-condensed phosphates (metaphosphates).

8. A process as claimed in claim 1, wherein the phosphate salts contain as counterions, cations of the first main group of the periodic system of elements.

9. A process as claimed in claim 1, wherein the cation is sodium, potassium or ammonium.

10. A process as claimed in claim 8, wherein the soluble phosphate salt is sodium pyrophosphate, sodium polyphosphate, or sodium hexametaphosphate.

11. A process for producing pigment granules for incorporation into building materials, comprising:
    a) providing an aqueous suspension of at least one pigment;
    b) adding to said suspension, in an amount of 0.1 to 5% by weight expressed as phosphate and based on weight of pigment, a soluble phosphate salt with a number ratio of monofunctional metal ions to phosphorus of 2:1 to 1:1, and
    c) spray-drying or pelletizing the suspension to obtain granules.

12. The process of claim 11, wherein the pigment is iron oxide.

* * * * *